United States Patent [19]

Johnson

[11] Patent Number: 5,145,103

[45] Date of Patent: Sep. 8, 1992

[54] PARTIAL ELIMINATION OF COPPER PLATE FROM STEEL STRIP BY MECHANICAL MEANS

[75] Inventor: Arnold T. Johnson, Davisburg, Mich.

[73] Assignee: Alfred Teves GmbH, Frankfurt am Main, Fed. Rep. of Germany

[21] Appl. No.: 599,217

[22] Filed: Oct. 17, 1990

Related U.S. Application Data

[63] Continuation-in-part of Ser. No. 525,787, May 18, 1990, Pat. No. 5,069,381.

[51] Int. Cl.⁵ .................................................. B23K 1/19
[52] U.S. Cl. .................................. 228/143; 228/172; 228/208; 228/239
[58] Field of Search ............... 228/126, 143, 172, 208, 228/239, 254, 263.15, 17.5; 138/140

[56] References Cited

U.S. PATENT DOCUMENTS

| | | | |
|---|---|---|---|
| 2,092,018 | 9/1937 | Quarnstrom | 228/143 |
| 2,373,116 | 4/1945 | Hobrock | 228/143 |
| 2,772,121 | 11/1956 | Meissner | 228/143 |
| 2,996,799 | 8/1961 | Gaul | 228/143 |
| 3,400,449 | 9/1968 | Maguire et al. | 228/172 |
| 5,042,710 | 8/1991 | Siemors et al. | 228/172 |

FOREIGN PATENT DOCUMENTS

| | | | |
|---|---|---|---|
| 53-0033304 | 9/1978 | Japan | 228/143 |
| 1165159 | 9/1969 | United Kingdom | 228/143 |

OTHER PUBLICATIONS

Metals Handbook Ninth Edition, vol. 6, pp. 1001–1013, "Brazing of Stainless Steels", copyright 1983.

*Primary Examiner*—Samuel M. Heinrich
*Attorney, Agent, or Firm*—Robert P. Seitter; J. Gordon Lewis

[57] ABSTRACT

A process for producing non-corrosive double-wall tubing in which an unbrazed, unsealed continuous double-wall tube of a given circumference is formed from a metal sheet composed of a first non-ferritic metal having a first defined region of exposed non-ferritic metal and a second region of a second metal in overlying relationship thereto, said exposed region having a width essentially equal to the circumference of the finished tube. The process including the steps of elevating the surface of the stainless steel to a brazing temperature while maintaining the material in a humidified gaseous atmosphere consisting essentially of a non-reactive carrier gas and reactive gas present in sufficient concentrations to achieve fluxing; maintaining the surface temperature of the steel for an interval sufficient to permit fusion between the selected metal and the non-ferritic steel surface; after metal fusion has been achieved, allowing the resulting fused metal material to cool to a first lowered temperature in a controlled non-oxidative atmosphere at a rate which retards the formation of fine-grained steel crystals in the metal; and after reaching a metallurgical transformation point, rapidly cooling the fused metal in a controlled atmosphere to a temperature below which the brazing metal is not reactive with oxygen. This process can be employed successfully in manufacturing unique, double-wall tubing which is relatively flexible and highly corrosion resistant.

19 Claims, 1 Drawing Sheet

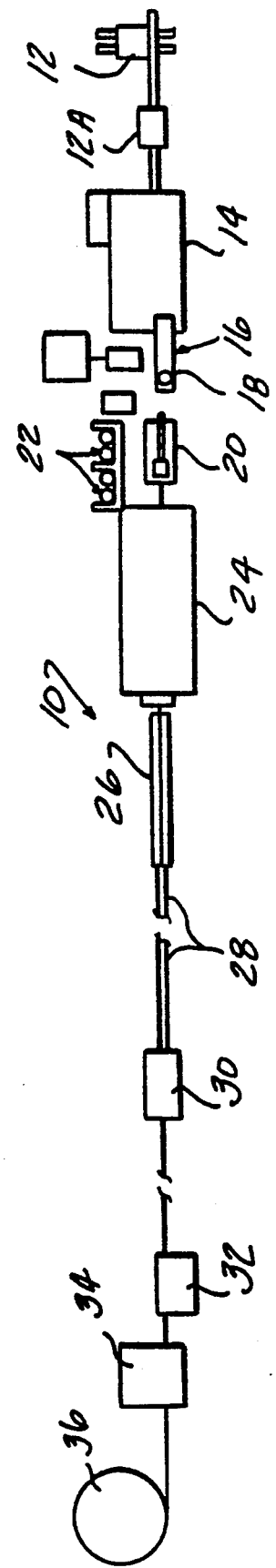

PARTIAL ELIMINATION OF COPPER PLATE FROM STEEL STRIP BY MECHANICAL MEANS

CROSS-REFERENCE TO RELATED APPLICATIONS

This application is a continuation-in-part of U.S. Ser. No. 07/525,787 filed May 18, 1990, now U.S. Pat. No. 5,069,381.

1. Field of the Invention

This invention relates to corrosion-resistant double-wall tubes and processes for manufacturing the same in a manner which eliminates the agglomeration or pooling of deposited brazing material on the exterior surface of the double-wall tube thereby eliminating the need for coating the exterior tube surface with carbon paint prior to brazing or subsequent fusing operations. Double-wall tubes such as those produced by the process of the present invention are suitable for a variety of uses such as in automotive brake lines.

2. Discussion of the Relevant Art

Safety standards in the automotive industry dictate that critical elements such as automotive brake lines be resistant to leakage, puncture and corrosion. In order to achieve these objectives, double-wall tubes for brake lines have been adopted as the industry standard. Such double-wall tubes consist of at least two thicknesses of a breakage-resistant metal material having sufficient properties to withstand fatigue due to prolonged vibration. The double-wall tube employed in automotive vehicles should be joined in such a manner as to eliminate the possibility of leakage at any joined seam. The material of choice, up to this point, has been limited to carbon steel due to its inherent flexibility, strength and mechanical durability. A suitable brazing material such as copper or various copper alloys is plated over the surface of the carbon steel prior to formation to permit the ultimate formation of a leak-resistant joint.

In conventional operations, the plated brazing material tends to agglomerate or pool on the exterior surface of the double-wall tube when the tube is subjected to the high temperatures necessary to achieve brazing or fusing. This agglomeration phenomenon interferes with the close tolerance conditions required for the finished product.

In order to prevent agglomeration, it has been necessary to apply black carbon paint over the formed tube before the brazing operation. The application of carbon paint is both costly and hazardous. The solvent and volatile portions of carbon paint flash off in the muffle furnace upon exposure to high temperatures in the muffle-furnace heat carrying some of the carbonaceous portion of the paint with it. The various volatilized materials deposit and accumulate in the muffle furnace tube necessitating weekly cleaning. The rigorous cleaning schedule reduces the life of furnace muffle tubes necessitating their frequent replacement.

The conventional procedure also results in high paint and thinner usage with accompanying difficulties in hazardous waste handling and disposal and worker exposure and safety. Furthermore, residual carbon deposited on the tubing during the brazing process must be mechanically removed and collected in a suitable environmentally safe manner. Finally, the use of black paint also is detrimental to formation of a suitable outside seam resulting in a greater percentage of substandard tubes.

The use of carbon steel in manufacture of double-wall tubes has drawbacks such as the susceptibility of carbon steel to corrosion. To eliminate this problem, carbon steel brake line tubes have been plated with a variety of corrosion-resistant materials, the most common of which is zinc. When employed zinc is plated onto the carbon steel surface of the brake line tube in a post-manufacturing process. In order to achieve sufficient corrosion resistance, plating thicknesses as great as 25 microns are employed. Unfortunately, the zinc-plated surface is susceptible to cracks and chips due to road hazards and continued prolonged vibration. This leads to corrosion and, ultimately, to leaking of the brake line tube.

In order to alleviate this problem, zinc-plated carbon steel tubes have been further coated with high-strength polymers such as polyvinyl fluoride. Polyvinyl fluoride coatings can also crack and chip; and ultimately leading to corrosion problems. Additionally, brake lines coated with polyvinyl fluoride are difficult to dispose of or recycle once the brake line or vehicle has reached the end of its useful life.

Ideally, brake lines would be manufactured from a suitable, inexpensive non-corrosive material. However, corrosion-resistant metals such as nickel-chromium (stainless) steel are not amenable to double-wall tube manufacturing processes. Great difficulties have been encountered in imparting a copper overlay to a stainless steel surface, and it has been widely held that copper-plated stainless steel could not be metallurgically brazed.

Additionally, the forming processes for manufacturing a continuous sealed double-wall tube require the use of lubricating compounds or materials, such as milling oils, which adhere to the surfaces of the metal and interfere with achieving a uniform 385° metallurgical braze. Removal of these contaminants prior to brazing is imperative but difficult.

Thus, it would be desirable to provide a process for manufacturing sealed double-wall tubing in which contaminating lubricants can be removed or rendered harmless prior to metallurgical brazing. It would also be desirable to provide a process in which the use of black carbon paint can be eliminated. It is also desirable to provide a process in which a highly corrosion-resistant base metal such as non-ferritic or stainless steel can be successfully and economically employed. It is desirable to provide a process in which a selected metal alloy can be successfully metallurgically bonded to a non-ferritic steel surface. It is further desirable to provide a corrosion-resistant double-wall sealed tubing suitable for use in the manufacture of automotive brake lines.

SUMMARY OF THE INVENTION

The present invention is a method for manufacturing a double-wall tube formed by brazing a selected metal alloy to a non-ferritic steel surface and thereby fusing two overlying steel surfaces in which the selected metal alloy is plateable on and is located in a defined discrete region of the steel surface. In this process, the temperature of the non-ferritic steel tube is raised from a first temperature to a second elevated temperature and maintained at that second elevated temperature for an interval sufficient to achieve fusion between the selected metal alloy and the non-ferritic steel surface. The first temperature is less than or essentially equivalent to the volatilization temperature of lubricating materials adhering to the steel surface, if any. The second elevated temperature is sufficient to trigger fusion between the selected metal alloy and the non-ferritic steel surface. The second temperature elevation occurs in a humidified gaseous atmosphere which consists essentially of a non-reactive carrier gas and a reactive gas suitable for and in sufficient concentrations to achieve and promote fluxing.

The non-ferritic steel is maintained in contact with the humidified gaseous atmosphere at or above the second temperature for an interval sufficient to permit fusion between the selected metal alloy and the non-ferritic steel surface. After metal fusion has been achieved, the resulting fused metal material is allowed to cool to a first lowered temperature in a controlled non-oxidative atmosphere at a rate which maximizes the temperature at which metallurgical transformation of the non-ferritic steel from an austenitic to a pearlite phase occurs.

After the metallurgical transformation point has been achieved, the resulting material can be rapidly cooled in a controlled atmosphere to a temperature below which the selected metal alloy is no longer reactive with oxygen. If desired, the resulting metal material can be further quenched in a suitable aqueous medium.

Before the brazing process is begun, the process of the present invention can include the additional optional step of removing any volatile contaminants remaining on the metal surface which were imparted there during any metal deformation steps. In the process of the present invention, this preferably comprises the step of elevating the surface temperature of the non-ferritic steel from a preliminary temperature to the volatilization temperature. The preliminary temperature may be ambient or any intermediate temperature substantially below the volatilization temperature. The temperature elevation step proceeds in the presence of a non-oxidative atmosphere at a rate sufficient to initiate an essentially instantaneous volatilization of volatilizable solvents and carriers present in the lubricating material.

The process of the present invention can be successfully employed in a process for producing a non-corrosive sealed double-wall tube. Also included in the present invention is a non-corrosive, sealed double-wall tubing suitable for use in automotive brake lines.

BRIEF DESCRIPTION OF THE DRAWINGS

In the present description, reference is made to the following drawing in which the FIGURE is a schematic view of the process of the present invention.

DESCRIPTION OF THE PREFERRED EMBODIMENT

The present invention is predicated on the unexpected discovery that a selected metal alloy such as copper or silver previously plated on a non-ferritic steel surface can be successfully fused to that surface in a brazing process. This brazing process permits the fusion of the double walls to one another, thereby producing a continuous, sealed non-corrosive metal tube.

It is also predicated on the discovery that a sheet of a non-ferritic material can be employed which has discrete regions of a selected metal alloy plated thereon and regions of exposed non-ferritic material, the exposed regions oriented such that these regions form the outer circumference of the double-wall tube.

The present invention encompasses a process for brazing a selected metal alloy to a discrete location on a non-ferritic steel surface thereby enabling the formation of a double-wall tube. The brazing process of the present invention comprises the following steps:

rapidly raising the temperature of the non-ferritic steel from a first temperature to a second elevated temperature sufficient to trigger fusion between the selected metal alloy and the non-ferritic steel surface, the temperature elevation occurring in a humidified gaseous atmosphere consisting essentially of a non-reactive carrier gas and a reactive gas suitable for and in sufficient concentration to achieve fluxing;

maintaining the non-ferritic steel in contact with the humidified gaseous atmosphere at the second temperature for an interval sufficient to permit fusion between the selected metal alloy and the non-ferritic steel surface;

once metal fusion has been achieved, allowing the resulting fused metal material to cool to a first lowered temperature in a controlled non-oxidative atmosphere at a rate which maximizes the temperature at which metallurgical transformation of the non-ferritic steel from an austenitic to a pearlite phase occurs; and after reaching the metallurgical transformation point, continuing cooling of the fused metal material in a controlled atmosphere to a temperature below which the selected metal alloy is not reactive with oxygen.

The humidified gaseous atmosphere employed in the first steps is preferably a mixture of nitrogen with sufficient hydrogen to achieve and maintain fluxing. A suitable volumetric concentration of hydrogen would be readily discernable by one reasonably skilled in the art. In the preferred embodiment, it has been found that concentrations of hydrogen between about 50% and about 75% by volume can be successfully employed. The process of the present invention is to be construed as encompassing functional equivalents of the described gases.

The term "non-ferritic steel" as used herein is generally defined as non-magnetic nickel-chrome stainless steel. In the preferred embodiment, the non-ferritic steel is a stainless steel consisting essentially of iron, chromium, nickel, manganese, silicon, and carbon. The amount of carbon is, preferably, limited to amounts no more than 0.03% by weight. An illustrative example of one such non-ferritic steel is set forth in Table 1.

TABLE 1

| TYPICAL ANALYSIS OF A NON-FERRITIC STEEL | |
|---|---|
| Element | Percent |
| Carbon | 0.03 |
| Manganese | 7.00 |
| Silicon | 0.50 |
| Chromium | 16.75 |
| Nickel | 5.00 |
| Nitrogen | 0.07 |

The selected metal alloy is one capable of being uniformly deposited on specified regions of the surface of the non-ferritic steel. The deposition process may be any suitable mechanical, chemical, and/or electrochemical process which will permit permanent or, at the minimum, semi-permanent mechanical adhesion of a selected metal alloy to the non-ferritic steel surface. The preferred selected metal alloys are alloys of metals such as copper, silver or any other suitable alloy. Additionally, non-alloyed metals such as copper, silver or any other suitable metal can also be successfully used in the process of the present invention.

The deposition process is, preferably, an electroplating process which can be employed successfully on non-ferritic or stainless steel which has been prepared by a Woods-nickel strike. The Woods-nickel strike imparts a Woods-nickel composition to the surface of the stainless steel. The Woods-nickel composition will mask the existing nickel-chromium oxides to permit copper plating. The plated surface is, then, rendered suitable for subsequent brazing procedures.

Where the objective is specifically the formation of double-wall tubing, the electroplateable brazing alloy is deposited on the non-ferritic steel surface prior to formation of the double-wall tubing. The double-wall tubing thus prepared can be rolled and formed by any conventional method. The formed tubing can, then, be heat treated in any manner which will achieve 365° brazing around the entire tube body. In the preferred embodiment, the brazing steps described subsequently are employed.

In the preferred embodiment, the selected brazing alloy is positioned selectively on steel surface in a manner which ultimately yields a metal sheet with a portion of the steel surface exposed. The exposed region conforms essentially to the outer circumferential surface of the finished tubing. In order to accomplish this, it is preferable, that the brazing alloy be uniformly deposited on both surfaces of the sheet of non-ferritic steel to be formed in any suitable chemical, mechanical or electrochemical manner such as those previously described.

To provide the suitable exposed region, it is preferred that a suitable portion of the deposited material be removed by any suitable means at any time prior to brazing. The dimensions of the removal area are such that the width of the total exposed surface corresponds essentially to the circumference of the finished double-wall tube. The removal area extends for the entire length of the metal sheet.

While the removal of the unwanted portion of brazing alloy can occur at any time in the process prior to brazing which is convenient and economical, in the preferred embodiment, the portion of the deposited metal is physically removed prior to tube formation. In the preferred embodiment, the selected portion of the surface of the steel strip is passed longitudinally through a suitable abrasion device capable of removing the desired amount of deposited material. In the preferred embodiment, the abrasion device is a strip polisher having at least one circular abrasive brush means of a predetermined diameter which revolving a speed sufficient to remove deposited metal material without adversely affecting the underlying non-ferritic metal surface. The strip polishers may also include suitable strip feeding means, as well as means to control contact between the metal strip and the circular abrasive brush means.

In the preferred embodiment, where processing speed and accuracy are desired, the abrasion device includes a plurality of serially offset rotating brush means positioned such that each removes a predetermined width of the overlying less than the ultimate exposure width to be attained. Each successive brush means is horizontally offset with coplanar axes of rotation and is positioned such that each successive removal area is contiguous to the one preceding it. Thus the desired area of deposited material can be removed quickly and efficiently.

Once the metal strip has been prepared, the metal may be stored or transferred immediately to tube forming operations. When the abrasion device is located upstream of the milling operation, it is to be understood that the metal strip is passed through the abrasion device at a rate compatible strip uptake by subsequent mill forming apparatus. When the stripping process occurs on a separate process line such as one adjacent to plating operations, the process rate can be adjusted accordingly. Regardless of the location of stripping operations, it is desirable that the stripped brazing alloy be handled and recycled as necessary and feasible.

Elimination of the portion of the selected metal alloy having a width essentially equivalent to the outer circumference of the double-wall tube eliminates the need for the application of black carbon paint by eliminating the undesirable agglomeration of the selected metal alloy on the exterior of the double-wall tubing occurring in conventional operations. This streamlines the tube forming process and reduces the number of seam failures occurring during the tube fabrication process.

In the preferred embodiment, in order to permit optimum brazing action, lubricating materials applied to the plated non-ferritic steel prior to formation of the continuous tube should be removed. The lubricating materials commonly employed in metal formation processes such as those in which a continuous metal tube is formed generally contain additional amounts of carbon or graphite materials suspended in a variety of volatilizable solvents and carrier materials. During conventional brazing operations, the various carbon-containing materials are sintered into a carbonaceous material which inhibits brazing action. Without being bound to any theory, it is believed that the brazing inhibition is due to the interposition of the carbonaceous material between layers of non-ferritic steel to be brazed which acts as an insulating material inhibiting suitable heat transfer.

In the process of the present invention, the formed metal material exits formation machinery at an essentially ambient preliminary temperature with lubricating materials adhering thereto. The surface temperature of the non-ferritic steel is rapidly elevated from this preliminary temperature, which is substantially below the volatilization temperature of the solvents and carriers present in the lubricating material, to a temperature equal to or above the temperature at which volatilizable solvents and carriers present in the lubricating material will experience essentially instantaneous volatilization. It will be appreciated that this temperature elevation is essentially instantaneous. This unique, essentially instantaneous, temperature rise is described herein as a "shock heating" of the metal surface. It has been found that a shock heat elevation to a temperature equal to or above 900° F. will achieve the essentially instantaneous volatilization desired. In order to prevent undesired oxidation of the selected metal alloy plating, the shock heating step occurs in a non-oxidative gaseous atmosphere. The gaseous material is preferably an anhydrous non-reactive gas such as one selected from the group consisting of nitrogen, hydrogen, carbon dioxide, and mixtures thereof. The non-oxidative gaseous atmosphere permits and promotes the volatilization of the volatilizable solvents and carriers present in the lubricating compound In the preferred embodiment, the non-oxidative gaseous atmosphere is nitrogen. However, functional equivalents of nitrogen are contemplated and considered within the scope of this invention.

Because the volatilization is essentially instantaneous, the solvents and carriers volatilize in a manner which physically drives them from the surface of the prepared metal. Where two sheets of metal overlay one another, such as in double-wall tubing, this process of rapid shock heating eliminates volatilizable solvents and carriers interposed between the two respective layers of non-ferritic steel. Heretofore, it has been almost impossible to completely eliminate such contaminants without employing complex mechanical scrubbing or removal operations. It is to be understood that in certain situations such as the formation of double-wall tubing, even such mechanical scrubbing is impossible. However, the shock heating process of the present invention permits removal of volatilizable solvents and carriers, thereby insuring a uniform 365° brazing operation.

Without being bound to any theory, it is believed that the shock heating procedure triggers an almost explosive volatilization of solvents and carriers in the lubricating material. When such shock heating is employed with double-wall tubing, the explosive force of the volatilization initiates a micro-expansion between the two respective overlaying walls. The gap between the walls created by the micro-expansion process permits the escape of volatilizable solvents and carriers. In the preferred embodiment, the volatilization temperature is above the volatilization point of the solvents and carriers but below any metallurgical phase transformation point for the non-ferritic steel. This range is between about 800° F. and about 900° F.

Once volatilizable solvents and carriers have been removed from the metal surface, brazing procedures can proceed. In order to promote brazing, it is necessary to substitute the non-oxidative gaseous atmosphere used in the elevation step with an atmosphere which will support fluxing. In the preferred embodiment, the atmosphere for supporting fluxing is a mixture of nitrogen and hydrogen which has been humidified and has a dew point greater than about −42° F. In the preferred embodiment, the substitution of atmospheres may occur in any convenient manner after the solvents and carriers have been volatilized. If necessary, the non-ferritic steel may be exposed to ambient temperature for a brief interval during the exchange of gaseous atmospheres. Once this has been completed, the temperature of the non-ferritic steel is raised rapidly from the volatilization temperature to a second elevated temperature sufficient to trigger fusion between the selected metal or metal alloy and the non-ferritic steel surface. The term "fusion" as used herein is defined as the existence or establishment of a metallurgical bond between two dissimilar metals. This rate of temperature elevation is as rapid as possible to approximate or achieve essentially instantaneous temperature rise. This phenomenon is defined herein as a second shock heating of the metal material.

The second elevated temperature to which the surface of the non-ferritic steel is elevated is a temperature sufficiently higher than the liquid temperature of the selected metal plated on the non-ferritic steel to trigger and maintain the fusion process. "Liquidus temperature" is defined herein as the temperature at which a metal or metal alloy begins to enter its molten state. In the preferred embodiment, where copper is employed the second elevated temperature is above 1,981° F., the liquidus temperature of the copper. The second elevated temperature is, preferably, at or above between 2,000 to 2,050° F. The upper maximum for the second elevated temperature is determined by both the properties of the non-ferritic steel and selected metal material employed. Ideally, the upper temperature is limited to a point below thermal degradation or melting point of the steel substrate and/or the degradation point of the selected metal material.

The fusion process triggered in the process of the present invention is, preferably, brazing. In the preferred embodiment, the metal material is elevated to the brazing temperature in as rapid a manner as possible. As described previously in conjunction with the solvent volatilization step, the metal is once again "shock heated" to produce a temperature rise from a point at or below the volatilization temperature of 900° F. to a point at or above the brazing temperature of between about 2,000° F. to about 2,050° F. This temperature elevation rate is sufficiently rapid to initiate brazing. The temperature rise is essentially "instantaneous". "Instantaneous temperature rise" as defined herein occurs in an interval no less than 400 degrees/second. This contrasts sharply with conventional brazing procedures in which the temperature is brought up to the brazing point in a steady controlled manner. Without being bound to any theory, it is believed that the "shock heating" helps to initiate opening of the crystal grain structure present in the non-ferritic steel surface to permit a brazing metal such as copper to penetrate into that surface.

Once the temperature of the non-ferritic steel has been elevated to the fusion temperature, this temperature is maintained for an interval sufficient to achieve the formation of a metallurgical bond between the selected metal material and the non-ferritic steel surface. This "heat soak" phase can be defined as the time at which the material is held at the appropriate fusion temperature to permit formation of a metallurgical bond between the selected metal material and the steel surface. Without being bound to any theory, it is believed that this "soak time" continues the opening of the fine grain structure of the surface of the stainless steel initiated during the second shock heat phase permitting the bond to form. At temperatures above 2,000° F. during the heat soak phase, there is a notable precipitation of carbon; triggering and indicating a change from a martensitic to an austenitic surface. Without being bound to any theory, it is believed that this phenomenon may be necessary to achieve bond formation between a selected material such as copper and non-ferritic steels such as nickel chromium steel.

During the heat soak phase, the metal is maintained in a humidified gaseous atmosphere similar or equivalent to that employed in the "shock heat" phase. Thus, the humidified gaseous atmosphere consists essentially of a non-reactive carrier gas and a reactive gas suitable for and in sufficient concentrations to achieve fluxing. In the preferred embodiment, the humidified gaseous atmosphere contains about 50 to about 75% by volume hydrogen in nitrogen with trace amounts of water. Humidification of the gaseous atmosphere may be achieved by bubbling a hydrogen stream through water.

After metal fusion has been achieved, the resulting fused material is maintained in the humidified gaseous atmosphere and permitted to cool to a first lowered temperature greater than the austenitic phase transformation temperature of the non-ferritic steel for an interval sufficient to help maximize the temperature at which subsequent metallurgical transformation of the non-ferritic steel from an austenitic phase to a pearlite phase occurs. In the preferred embodiment, the fused metal material is maintained at this first lowered temperature for about four to eight seconds. This temperature is, preferably, greater than about 1,250° F. After reaching this first metallurgical transformation associated with a temperature of about 1,250° F. and a time interval of 4 to 8 seconds, the fused metal can be rapidly cooled in the controlled atmosphere to a second lowered temperature below which the non-ferritic metal enters the pearlite phase. In the preferred embodiment, this second lowered temperature is about 950° F. Without being bound to any theory, it is believed that this rapid cooling to the second lowered temperature is analogous to a metallurgical freezing. The term "freezing" as used herein defines a process which promotes a coarse grained crystal lattice structure in the non-ferritic steel. It is believed that this coarse grain structure improves the malleability of the resulting material.

After reaching this second lowered temperature, the fused metal can be cooled at a controlled rate in a non-oxidative atmosphere to a third lowered temperature below which the surface of the selected metal is not reactive with oxygen. Where copper is employed as the selected metal material, this third lowered temperature is below about 500° F. and preferably between the temperatures of about 350° F. and 500° F. Below this temperature, the selected brazed material, such as the copper, is not reactive with oxygen. This prevents undesired discoloration of the copper surface. At this point, the material can be safely removed from the controlled environment with little or no fear of oxidation or discoloration.

In order to facilitate ease of handling of the continuous double-wall tubing or other metal material, the material can, finally, be quenched in a suitable aqueous medium.

In order to further illustrate the process with regard to producing non-corrosive, sealed double-wall tubing, reference is made to the FIGURE which schematically depicts a tube forming process and line incorporating the process of the present invention.

The FIGURE is a production line 10 having a pay-off reel 12 which contains strips of non-ferritic steel with the selected metal being overlaid and mechanically, chemically or electrochemically attached to the non-ferritic steel surface.

The continuous sheet of non-ferritic steel is, preferably, between 0.25 and 0.35 millimeters thick and has a width suitable for producing a double-wall tube of an appropriate diameter. The length of the continuous strip is determined by handling constraints and requirement needs. The continuous strip (not shown) is advanced to a suitable roll forming machine 14 which sequentially produces unbrazed, unsealed double-wall tubing. The tubing is immediately advanced to a volatilization station 16 which includes means for removing volatile portions of lubricating material employed during the roll forming steps (not shown).

The strips of non-ferritic steel may be prepared with the selected metal overlay and the suitable exposed metal region situated prior to placement of the strips on pay-off reel 12. However, in the preferred embodiment as shown in the FIGURE, a copper removal station 12A may be located downstream of the payoff reel 12 in advance of a suitable roll forming machine 14. The copper removal station 12A may include suitable copper removal means and copper collection means. In operations which include a copper removal station 12A, it is to be understood that the strips of non-ferritic steel contained on the pay-off reel 12 may have the selected metal overlaying the entire metal surface as this material will be removed in the copper removal operation.

In the preferred embodiment, the removing means employed in the volatilization station is a heating means which comprises a source 18 for anhydrous nitrogen gas and a heater (not shown). The heater can be any suitable heating means such as a resistance heater, an induction heater or a muffle furnace. In the preferred embodiment, an induction heater is employed. The induction heater is configured to permit the elevation to the volatilization temperature at or above 900° F. at a rate and for a period sufficient to permit effective volatilization of solvents and carriers employed in lubricating material employed during the milling process. In the preferred embodiment, as set forth in the FIGURE, any particular section of the continuous double-wall tube is exposed in the volatilization station 16 for a period between about 5 seconds and about five minutes; preferably between about 5 and about 10 seconds. The tubing is, then, conveyed through a conduit (not shown) to the brazing station 20 upon exiting the volatilization station 16. The conduit and volatilization station 16 are equipped with suitable means for venting the volatilized solvents and introduced nitrogen gas in a suitable manner (not shown).

The brazing station 20 consists of heating means for rapidly rising the surface temperature of the continuous tube to an elevated temperature sufficient to trigger fusion between the non-ferritic steel and the selected metal layers thereon. Also included are means for providing a humidified gaseous atmosphere within the brazing station. The heating means can be either a resistance or an induction heater or other suitable heater capable of essentially instantaneously raising the surface temperature of the non-ferritic steel to a temperature at or above the brazing temperature for the selected metal layered thereon (not shown). The gas preferably employed is composed of a nitrogen atmosphere containing sufficient hydrogen to achieve and maintain fluxing. In the preferred embodiment, the gas is humidified by bubbling the hydrogen through a suitable bubbling tank (not shown). The gas is supplied in any conventional manner such as from gas bank 22 in the FIGURE. Once the material has been shock heated in the brazing station 20, it is conveyed to a suitable heat soak station 24. The heat soak station 24 can be any type of heater capable of maintaining the double-wall tube at a temperature at or above a brazing temperature of about 2,050° F. In the preferred embodiment, the heat soak station 24 is an elongated muffle furnace. The heat soak station 24 is also supplied with the humidified gaseous mixture of hydrogen and nitrogen from the gas bank 22.

Upon exiting the heat soak station 24, the continuous metal tube has been fused into its leak-proof, double-wall state. At this point, it can be conveyed through a water-cooled jacket 26 to provide a controlled cool-down phase in which the elevated temperature is maintained at or above about 1,250° F. for a period sufficient to control grain size and structure to provide larger grain size for greater flexibility of the resulting tube. In general, each particular section of the continuous tube is exposed to the controlled cool-down phase for a period sufficient to maximize the temperature at which the non-ferritic metal transforms from austenitic through its transition phase into its pearlite phase. The initial controlled cool-down occurs immediately after the section of the continuous double-wall metal tube exits the heat soak station 24. This phase proceeds for a period of about three to six seconds. The continuous metal tubing is maintained in a controlled atmosphere and is, then, quickly cooled through its isothermal transformation state from its austenitic phase to its pearlite phase in a water-cooled jacket 26. This minimizes the time in which the material is in its transformation stage and maximizes the temperature at which the material exits that stage and enters into the pearlite phase. In the preferred embodiment, this occurs at approximately 950° F.

After this step is completed, the material is passed through an air cooling station 28 which can be comprised of a multiple fin-tubed heat exchanger. The tubing is maintained in a controlled atmosphere during the air cooling stage to prevent oxidation and discoloration of the fused copper material which would occur if it were exposed to oxygen. After the tubing reaches a temperature at or below 500° F., the material may be liquid quenched in the quench bath 30 to further reduce the latent heat to a point where the continuous metal tube can be easily handled. The material can then be exposed to air and be subjected to post-process stations such as testing stations 32, straightening stations 34, and eventually, a coiling station 36.

The process of the present invention permits the formation of unique brazed double-wall tubing from a copper plated metal strip. The tubing thus formed is comprised of a continuous latitudinal spiral of metal providing two thicknesses of the non-ferritic steel at any point through the circumference of the tube. The edges of the resulting strip are suitably shaped to permit the edges to sealingly conform to the contours of the associated external or internal surface of the tube and a defined region of exposed non-ferritic metal having a width essentially equal to the circumference of the double-wall tube. In this manner, the tubing can be brazed to provide a sealed surface, as well as continuous brazing around 365° of the double-wall metal tube. This tube is uniquely constructed in that the material of choice is a non-ferritic steel, such as nickel chromium steel which is brazed by the action of heating copper material plated thereon. The resulting tube is highly resistant to corrosion.

What is claimed is:

1. A process for producing double-wall tubing comprising the steps of:
    sequentially forming an unbrazed, unsealed continuous double-wall tube of a given circumference from a metal sheet of a defined width, said metal sheet composed of a first non-ferritic metal having a first defined surface region of exposed non-ferritic non-ferritic metal and a second defined region of a second metal in overlying relationship to said sheet, said second metal capable of forming fusion bond with said first metal, said exposed non-ferritic metal region having a width less than said defined width and essentially equal to said circumference of said resulting double wall tube; and then
    fusing said non-ferritic metal and said overlying metal to one another in a suitable metallurgical process.

2. The process of claim 1 wherein said second metal is a metal capable of being electroplateable over said non-ferritic metal, said second metal selected from the group consisting of copper, silver, copper alloys, silver alloys, and mixtures thereof.

3. The process of claim 1 wherein said suitable metallurgical process comprises the steps of:
    rapidly raising the surface temperature of said unbrazed, unsealed continuous tube to an elevated temperature sufficient to trigger fusion between said non-ferritic metal and said second overlying metal, said temperature elevation occurring in a humidified gaseous atmosphere consisting essentially of at least one inert carrier gas and sufficient hydrogen to achieve and maintain fluxing;
    maintaining said unsealed continuous tube in contact with said humidified gaseous atmosphere at said elevated temperature for an interval sufficient to permit fusion between said overlaying metal and said non-ferritic metal to form a fused leak-proof, double-wall continuous metal tube;
    after fusion between said metal and said non-ferritic metal has occurred, maintaining said resulting fused double-wall metal tube in said humidified gaseous atmosphere and allowing said fused continuous metal tube to cool to temperature in a first lowered temperature range, said first lowered temperature range being lower than said fusion temperature and higher than the temperature at which an initial metallurgical transformation of the non-ferritic metal from an austenitic phase to an intermediate phase occurs;
    then, rapidly cooling said fused continuous metal tube to a temperature in a second lowered temperature range, said second lowered temperature range being lower than the temperature at which metallurgical transformation of said fused metal from said intermediate phase occurs; and
    after reaching said temperature in said second lowered temperature range, slowly cooling said fused continuous metal tube in a non-oxidative atmosphere to a third lowered temperature below which the selected metal fused on said continuous metal tube is not reactive with oxygen.

4. The process of claim 3 further comprising the step of:
    removing volatile portions of lubricating material employed during said forming step from said surface of said continuous tube, said volatile portions consisting essentially of solvents and carriers, said removal step occurring prior to fusion of said metals.

5. The process of claim 4 wherein said removal of volatile components of said lubricating materials comprises the step of:
    elevating the temperature of said unsealed continuous tube from an essentially ambient temperature to a volatilization temperature, said volatilization temperature being sufficient to volatilize a substantial portion of said solvents and carriers present in said lubricating materials, said elevating step proceeding in the presence of a non-oxidative gaseous atmosphere at a rate sufficient to initiate an essentially instantaneous volatilization of said solvents and carriers present in said lubricating material.

6. The process of claim 5 wherein said elevation of the temperature of said continuous metal tube to said volatilization temperature occurs essentially instantaneously.

7. The process of claim 5 wherein said volatilization temperature is between about 700° F. and about 900° F.

8. The process of claim 3 wherein said elevated temperature sufficient to trigger fusion between said non-ferritic metal and said selected metal layered thereon is greater than the melting point of said selected metal.

9. The process of claim 3 wherein said elevated temperature sufficient to trigger fusion between said non-ferrictic steel and said selected metal layered thereon is greater than about 2,050° F.

10. The process of claim 3 wherein said second lowered temperature is less than about 950° F.

11. The process of claim 10 wherein said hydrogen is present in an amount between about 50% by volume and about 75% by volume of the gaseous mixture and said gaseous atmosphere suitable for maintaining fluxing has a dew point greater than about minus 42° F.

12. The process of claim 11 wherein the non-ferritic metal consists essentially of iron, chromium, nickel, manganese, silicon, nitrogen, and carbon.

13. The process of claim 12 wherein the non-ferritic steel contains no more than 0.03% by weight carbon.

14. The process of claim 13 wherein said third lowered temperature is less than about 500° F.

15. The process of claim 14 further comprising the step of:
exposing said unsealed continuous tube to ambient temperature prior to raising the surface temperature of said tube material to said elevated temperature, said exposure occurring for an interval sufficient to permit removal of said non-oxidative gaseous atmosphere.

16. The process of claim 2 wherein said metal sheet is formed by the following steps:
physically removing a portion of said second metal which has been previously uniformly deposited over first and second faces of said first non-ferritic metal to expose said first defined surface region of non-ferritic metal.

17. The process of claim 16 wherein said physical removal step comprises:
mechanically abrading a discrete region of said overlying second metal.

18. A process for producing double-wall tubing comprising the steps of:
sequentially forming an unbrazed, unsealed continuous double-wall tube of a given circumference from a metal sheet of a defined width composed of a first non-ferritic metal having a first defined surface region of exposed non-ferritic metal and a second defined region of a second metal in overlying relationship to said sheet, said second metal capable of being electroplated over said non-ferritic metal and forming a fusion bond therewith wherein said second metal is selected from the group consisting of copper, silver, copper alloys, silver alloys and mixtures thereof, said exposed non-ferritic metal region having a width less than said defined width and essentially equal to said circumference of said resulting double-wall tube;
rapidly raising the surface temperature of said unbrazed, unsealed continuous tube to an elevated temperature sufficient to trigger fusion between said non-ferritic metal and said second overlying metal, said temperature elevation occurring in a humidified gaseous atmosphere consisting essentially of at least one inert carrier gas and sufficient hydrogen to achieve and maintain fluxing;
maintaining said unsealed continuous tube in contact with said humidified gaseous atmosphere at said elevated temperature for an interval sufficient to permit fusion between said overlaying metal and said non-ferritic metal to form a fused leak-proof, double-wall continuous metal tube;
after fusion between said overlying metal and said non-ferritic metal has occurred, maintaining said resulting fused double-wall metal tube in said humidified gaseous atmosphere and allowing said fused continuous metal tube to cool to temperature in a first lowered temperature range, said first lowered temperature range being lower than said fusion temperature and higher than the temperature at which an initial metallurgical transformation of the non-ferritic metal from an austenitic phase to an intermediate phase occurs;
the, rapidly cooling said fused continuous metal tube to a temperature in a second lowered temperature range, said second lowered temperature range being lower than the temperature at which metallurgical transformation of said fused metal from said intermediate phase occurs; and
after reaching said temperature in said second lowered temperature range, slowly cooling said fused continuous metal tube in a non-oxidative atmosphere to a third lowered temperature below which the selected metal fused on said continuous metal tube is not reactive with oxygen.

19. The process of claim 18 further comprising the step of:
elevating the temperature of said unsealed continuous tube from an essentially ambient temperature to a volatilization temperature, said volatilization temperature being sufficient to volatilize a substantial portion of solvent and carriers present in lubricating materials employed during said forming step which remain on said surface of said continuous tube, said elevating step proceeding in the presence of a non-oxidative gaseous atmosphere at a rate sufficient to initiate an essentially instantaneous volatilization of said solvents and carriers present in said lubricating material.

* * * * *

UNITED STATES PATENT AND TRADEMARK OFFICE
CERTIFICATE OF CORRECTION

PATENT NO. : 5,145,103
DATED : September 8, 1992
INVENTOR(S) : Arnold T. Johnson It is certified that error appears in the above-indentified patent and that said Letters Patent is hereby corrected as shown below:

Abstract:
Title page, item [57], col. 2, line 13, after "and" insert --a--.

Column 1, line 53, delete "heat".
Column 2, line 18, delete "and". (2nd occurrence).
Column 5, line 49, delete "which".
Column 5, line 59, after "overlying" insert --material--
Column 6, line 3, after "compatible" insert --with--.
Column 6, line 53, after "plating" insert --material--.
Column 6, line 61, after "compound" insert --.--.
Column 7, line 55, delete "liquid" and insert --liquidus--.
Column 11, line 55, after "forming" insert --a--.
Column 12, line 19, after "to" insert --a--. (2nd occurrence).
Column 14, line 46, delete "solvent" and insert --solvents--.

Signed and Sealed this

Twenty-first Day of December, 1993

Attest:

BRUCE LEHMAN

Attesting Officer        Commissioner of Patents and Trademarks